United States Patent [19]
Lloyd

[11] 3,745,386
[45] July 10, 1973

[54] MOVING COIL MOTOR
[75] Inventor: William J. Lloyd, Belmont, Calif.
[73] Assignee: Hewlett-Packard Company, Palo Alto, Calif.
[22] Filed: Feb. 28, 1972
[21] Appl. No.: 229,890

[52] U.S. Cl. .............................. 310/13, 336/136
[51] Int. Cl. .......................................... H02k 41/02
[58] Field of Search ............................ 336/136; 310/12-14, 15, 27; 179/115.5, 119, 120

[56] References Cited
UNITED STATES PATENTS

| | | | |
|---|---|---|---|
| 2,442,016 | 5/1948 | Poole | 310/29 X |
| 3,470,399 | 9/1969 | Johnson et al. | 310/13 |
| 3,054,976 | 9/1962 | Lipshutz | 336/136 |
| 3,440,459 | 4/1969 | Pitt et al. | 310/15 |

FOREIGN PATENTS OR APPLICATIONS

| | | | |
|---|---|---|---|
| 789,726 | 1/1958 | Great Britain | 310/27 |
| 789,725 | 1/1958 | Great Britain | 310/27 |

Primary Examiner—D. F. Duggan
Attorney—A. C. Smith

[57] ABSTRACT

An improved linear motor includes a motion transducer disposed within the core section of the magnetic circuit for the shuttle of the linear motor to provide a velocity output signal substantially unaffected by magnetic fields and eddy currents associated with current in the linear motor coil. The positional adjustment of the magnetic transducers carried by the shuttle of the linear motor is facilitated by the cam action of an adjustment tool which fits within a recess in the shuttle and engages a transverse slot within the support for the magnetic transducer.

1 Claim, 5 Drawing Figures

3,745,386

MOVING COIL MOTOR

BACKGROUND AND SUMMARY OF THE INVENTION

Certain known linear actuators for radially positioning the magnetic transducers of a disc memory include a velocity transducer centrally disposed within the shuttle and protruding beyond the ends of the core. Because the fringing magnetic fields present around the ends of the core structure and the eddy currents within the core structure produced by the current in the linear actuator coil are coupled to the transducers, the resultant velocity signal produced thereby is nonlinear over the range of shuttle positions. A pair of velocity transducers, each suffering the same effects of fringing magnetic fields and eddy currents, are commonly used in side-by-side location and in opposing connection to cancel out the nonlinearities caused by the fringing fields. However, this increases the moving mass coupled to the shuttle and also reduces the quantity of magnetic material in the central core region about the velocity transducers.

These disadvantages of the prior art techniques are overcome in the present invention which uses an improved velocity transducer that is shorter than the core section and that is adequately shielded from the effects of fringing fields. In addition, the shuttle includes adjustment means for altering the static position of the magnetic transducer on the disc memory for a given translational position of the linear motor.

DESCRIPTION OF THE PREFERRED EMBODIMENT

Figure 1:
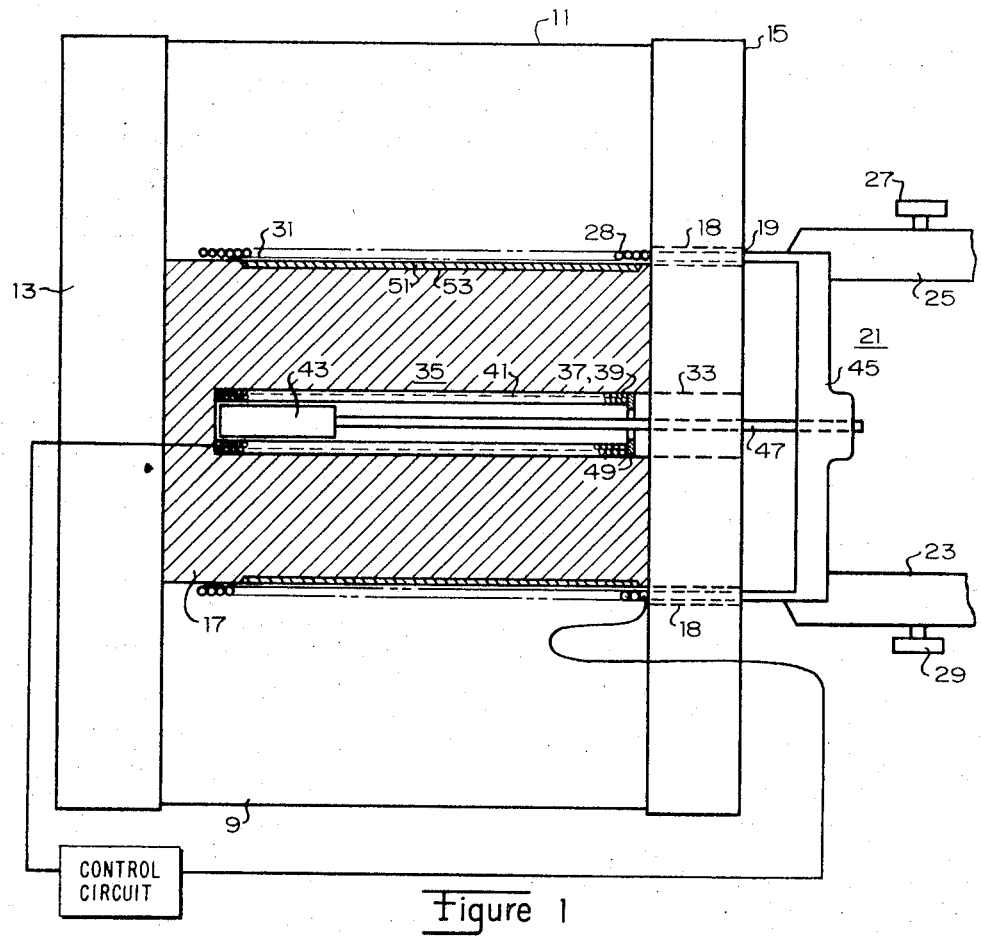
FIG. 1 is a sectional view of the linear motor of the present invention.

Referring now to FIG. 1 there is shown a magnetic structure which includes a pair of magnets 9, 11 spaced side by side between end plates 13, 15 with a cylindrical core 17 attached to the rear end plate 13 and protruding through an aperture 18 in the front plate 15. The radial spacing between the core 17 and the aperture 18 forms an air gap 19 in the magnetic circuit across which a radial field is produced. Shuttle 21 includes a pair of laterally spaced support members 23, 25 which support the shuttle on rails (not shown) for movement in a longitudinal direction. The shuttle 21 includes a coiled conductor 28 which is helically wound on a nonconductive thin-walled portion 31 of the shuttle 21 to form an electromagnet for interaction with the radial field in the air gap 19.

Disposed within the axial bore 33 of the cylindrical core section 17 is a velocity transducer 35 which includes a pair of windings 37, 39 disposed about a hollow stainless steel bobbin 41. A cylindrical magnet 43 which serves as a source of magnetic field is mounted within the hollow bobbin 41 for translational movement therewithin in response to movement of the shuttle 21. The magnet 43 is rigidly coupled to the shuttle 21 near a central location on the front plate 45 of the shuttle by a coupling rod 47. A magnetic shunt 49 of soft iron and having an aperture therethrough for the coupling rod 47 is disposed within the axial bore 33 in the cylindrical core 17 adjacent the end of the windings 37, 39. This shunt assures that stray magnetic fields associated with the current in the coiled conductor 28 of the linear motor are not coupled to the windings 37, 39. Also, the surrounding magnetic material of the core 17 serves as the flux return path for the magnet 43.

Figure 2:
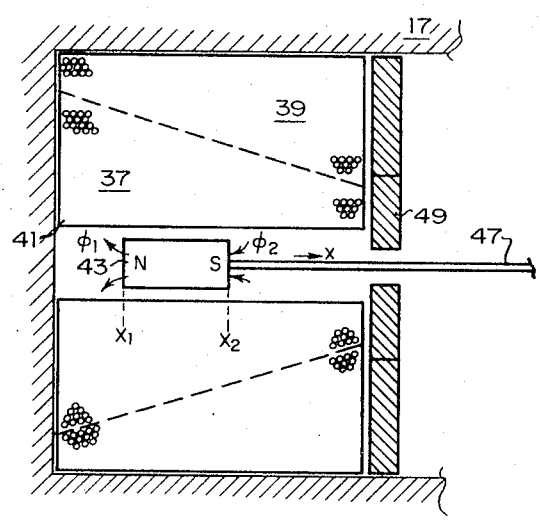
FIG. 2 is a sectional view of the velocity transducer of FIG. 1.

As shown in FIG. 2, this transducer includes a bobbin 41 on which is wound a set of tapered windings 37, 39. The density of these windings (i.e. the number of turns of the winding per unit length of the bobbin) varies substantially linearly in opposite directions from opposite ends of the bobbin 41. The source 43 of magnetic flux may be attached securely to coupling rod 47 using a suitable potting compound such as Teflon-loaded Delrin cast about both the magnet 43 and the coupling rod 47. This enhances the slidable movement of the magnet source 43 within the bobbin 41 (formed, for example, of stainless steel) without the aid of lubricants and without producing wear particles. The thin-walled bobbin 41 of stainless steel conducts eddy currents due to the movement of magnet 43 but provides a superior bearing surface for the slidable magnet 43.

It can be shown that the voltage generated by each of the coils 36, 39 in response to movement of the magnet 43 is a function of the rate of change of position of the magnet 43, its flux and the number of turns of the coil 37, 39 intercepted by the changing flux. Thus, for a given coil, the voltage is as follows:

$$e_1 = \Phi \cdot dN_1/dt \tag{1}$$

where $\Phi$ is the flux from magnet 43 (constant) and N is the number of turns.

For a tapered coil:

$$e_1 = \Phi \, dN_1/dx \cdot dx/dt \tag{2}$$

where Velocity is $dx/dt$.

But, for a linearly-tapered winding:

$$dN_1/dx = Kx_1 \tag{3}$$

Thus, the voltage for each of the coils is:

$$e_1 = \Phi \, Kx_1 V; \text{ and} \tag{4}$$

$$e_2 = \Phi \, Kx_2 V \tag{5}$$

The coils 37, 39 are connected in series-opposing configuration and the output voltage thus is:

$$E_{out} = KV\Phi(x_1 - x_2) \tag{6}$$

Since $(x_1 - x_2)$ is the length ($Lm$) of the magnet 43, the output is:

$$E_{out} = 2KV\Phi \, Lm \tag{7}$$

This analysis assumes that the length (Lm) of the magnet 43 is short and disposed entirely within the length of the bobbin 41 for all movements of the magnet 43 in response to translational movement of the shuttle 21.

The coils 37, 39 may be wound simultaneously from opposite ends of the bobbin using a pair of wire guides which are moved along the length of the bobbin 41 from the opposite ends at the rate which is suitable for establishing the linear taper of the winding density with length along the length of bobbin 41. It should be noted that the usable stroke length is L - Lm. Since Lm is not a function of the coil length (L), the ratio of stroke to the length of the bobbin 41 can approach unity. Thus, for a transducer of over-all length of approximately 4½ inches and a magnet 43 of approximately 1-inch length, the usable stroke length is approximately 3 inches.

In operation of the linear motor of the present invention, a signal is applied to the coiled conductor 28 through flexible connections (not shown) to establish an electromagnetic field about the conductor which interacts with the radial permanent magnetic field within the air gap 19 to produce lineal movement of the coiled conductor 28 and of the shuttle 21 that is attached thereto. The shuttle 21 carries with it the cylindrical magnet 43 within the bobbin of transducer 35 to produce in the windings 37, 39 of the transducer an electrical signal which is indicative of the direction and velocity of the shuttle 21. These signals, together with suitable digital means (not shown) for indicating position of the shuttle 21 along its lineal path of movement, are used to control the movement of the shuttle in a conventional manner. Also, in order to maintain the inductance of the coiled conductor 28 substantially constant over the linear travel of the shuttle 21, a shorted conductor 51 is disposed on the cylindrical surface of the core section 17. This shorted conductor 51 is molecularly-deposited copper (plated or sputtered into place) which is overformed in a cylindrical recess 53 and which is subsequently machined to provide a substantially uniform cylindrical core 17. The core 17 and end plates may then be plated with a suitable anti-corrosion material such as nickel. Thus, when the shuttle 21 is located near its minimally extended position, the inductance of the coiled conductor 28 is decreased by the shorted conductor 51 which reduces the effect of the core 17 on the inductance of the coiled conductor 28. Also, in order to insure accurate indication of the velocity of the shuttle 21, the transducer 35 is disposed well within the cylindrical core 17 in order to avoid the effects of stray magnetic fields and eddy currents due to current in the coil 28 which tend to destroy the linearity of electrical indication of the velocity of the magnet 43.

Figure 3:
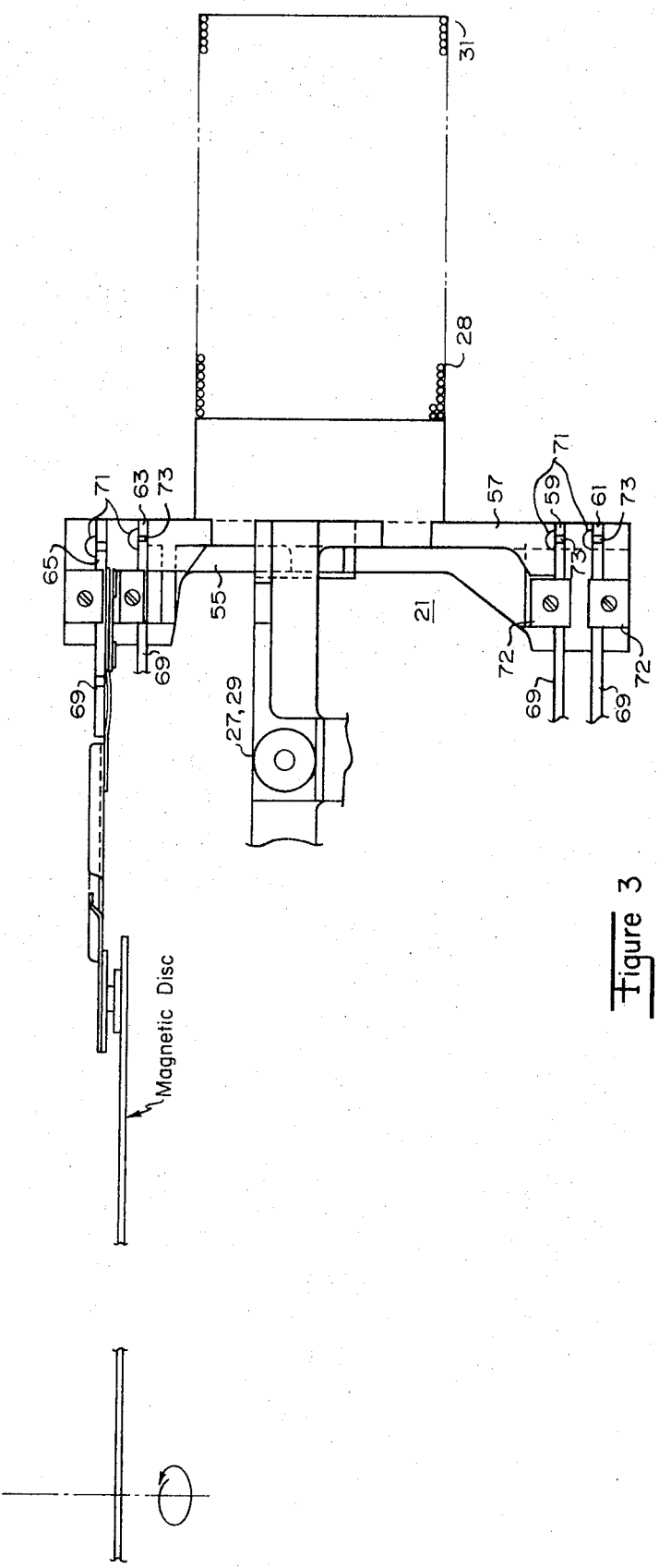
FIG. 3 is a side view of the shuttle of the motor of FIG. 1.
Figure 4:
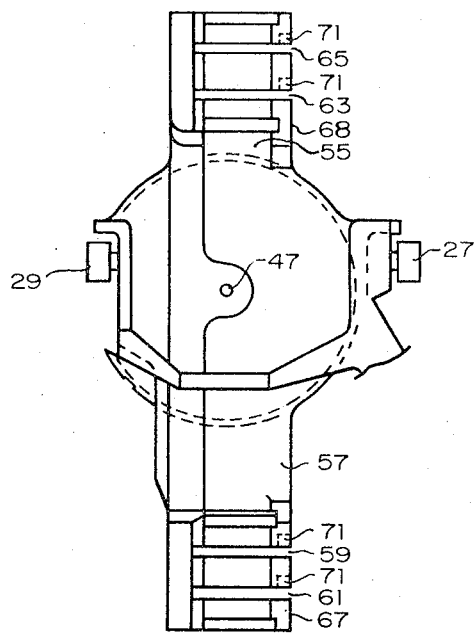
FIG. 4 is an end view of the shuttle of FIG. 3.
Figure 5:
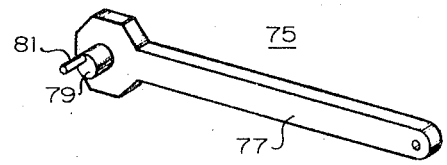
FIG. 5 is a perspective view of the adjustment tool for the shuttle of FIG. 3

Referring now to FIGS. 3 and 4, the shuttle 21 includes a pair of vertically spaced support arms which are arranged to support a pair of magnetic transducers (not shown) with respect to the surfaces of a disc memory unit. Each of these lateral extensions 55, 57 includes a pair of substantially horizontally oriented slots 59, 61, 63 and 65 which communicate with one side face 67, 68 of the lateral extensions 55, 57. These slots are substantially parallel aligned with the axis of movement of the shuttle 21 and are arranged to hold therein a support member 69 for a magnetic data signal transducer (not shown). In order to provide proper axial positioning of such magnetic transducers for a given position of the shuttle 21, it is necessary to adjust the axial positions of the support members 69 within the corresponding slots 59–65. For this purpose, a recess 71 is formed in each of the faces 67, 68 of the lateral extensions adjacent the corresponding slots 59–65 to form a substantially semicircular recess that communicates with the slot in the face 67, 68. Each of the support members 69 includes a transverse slot 73 on an edge thereof which communicates with the face 67, 68 of each of the lateral extensions 55, 57. The recesses 71 and the transverse slots 73 in each of the supports 69 thus furnish camming surfaces for movement of the support members 69 within the corresponding slots 59–65. An adjustment tool, as shown in FIG. 5, may thus be conveniently disposed within the recess 71 and transverse slot 73 to effect translational adjustments of the support members 69 within the slots 59–65. This adjustment tool 75 includes a body portion having a lever arm 77 and a protruding boss 79 which is arranged to seat within the recess 71. A protruding pin 81 located eccentric the rotational center of the boss 79 within the recess 71 thus engages the transverse slot 73 within a support 69 such that rotational movement of the lever arm 77 produces translational movement of the support member 69 within the corresponding slot 59–65. Once the adjustment is properly made, a clamping plate 72 for each support member 69 may be tightened into place to laterally squeeze the support member 69 firmly within the slot 59–65.

I claim:

1. Linear positioning apparatus comprising:

a magnetic structure including an outer magnetic circuit and an inner magnetic circuit, at least one of which includes a source of magnetic flux, said inner magnetic circuit including a cylindrical core of magnetic material having an axial bore therein and being supported at one end thereof on said outer magnetic circuit, and said outer magnetic circuit including a front plate having an aperture therein larger than the diameter of said cylindrical core for forming therewith an air gap for supporting a radial magnetic field thereacross;

shuttle means mounted with respect to said magnetic structure for lineally slidable motion through the air gap, in a direction normal to the radial magnetic field therein, said shuttle means having a conductor wound thereon for producing in response to applied electrical signal a magnetic field which interacts with the radial magnetic field in the air gap of said magnetic structure to produce linear motion of the shuttle means;

transducer means including a pair of windings disposed on a bobbin having an internal bore therein and being disposed within the axial bore of said core recessed therein from the ends thereof, said transducer means including a source of magnetic flux slidably disposed within the bore of the bobbin and rigidly coupled to said shuttle means, the windings of said transducer means being disposed on the bobbin with winding densities that decrease substantially linearly with length along the bobbin from opposite ends thereof;

circuit means connected to the winding of the transducer means for applying electrical signal to said conductor wound on said shuttle means to control the linear motion thereof; and a magnetic shunt disposed within the axial bore of said core adjacent the bobbin therewithin and having an aperture for passage therethrough of the rigid coupling between the shuttle means and the source of magnetic flux for said transducer means.

* * * * *